April 10, 1962  HARUHIRO SAITO  3,029,371
RADIO CONTROL APPARATUS FOR ELECTRIC RUNNING TOYS
Filed June 9, 1955  3 Sheets-Sheet 1
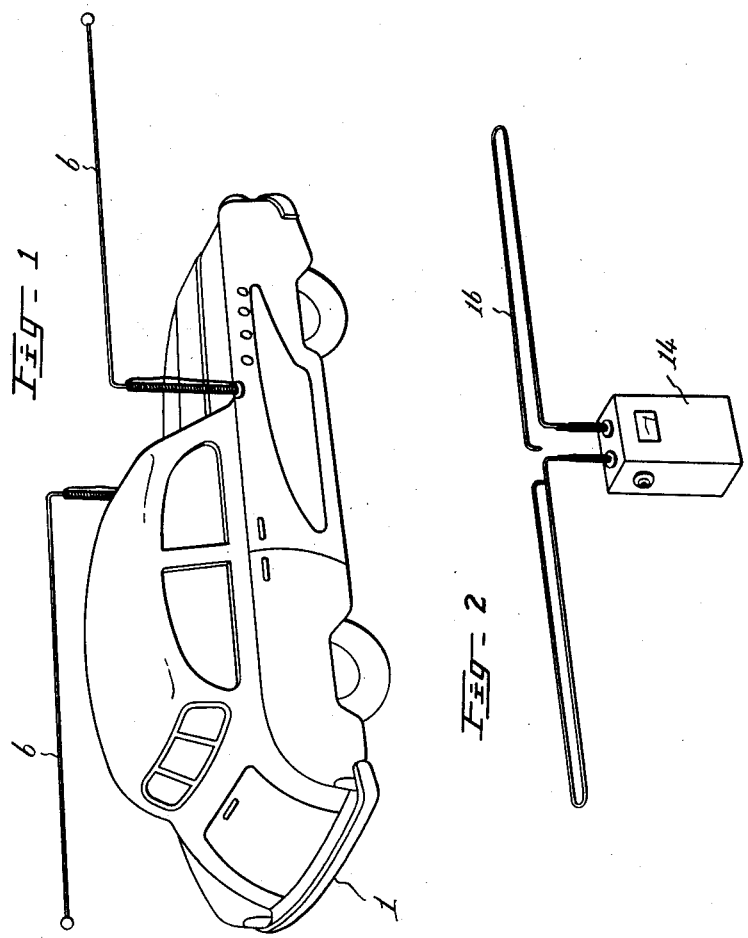
Inventor
Haruhiro Saito
By: Michael S. Striker
agt.

April 10, 1962     HARUHIRO SAITO     3,029,371
RADIO CONTROL APPARATUS FOR ELECTRIC RUNNING TOYS
Filed June 9, 1955     3 Sheets-Sheet 2
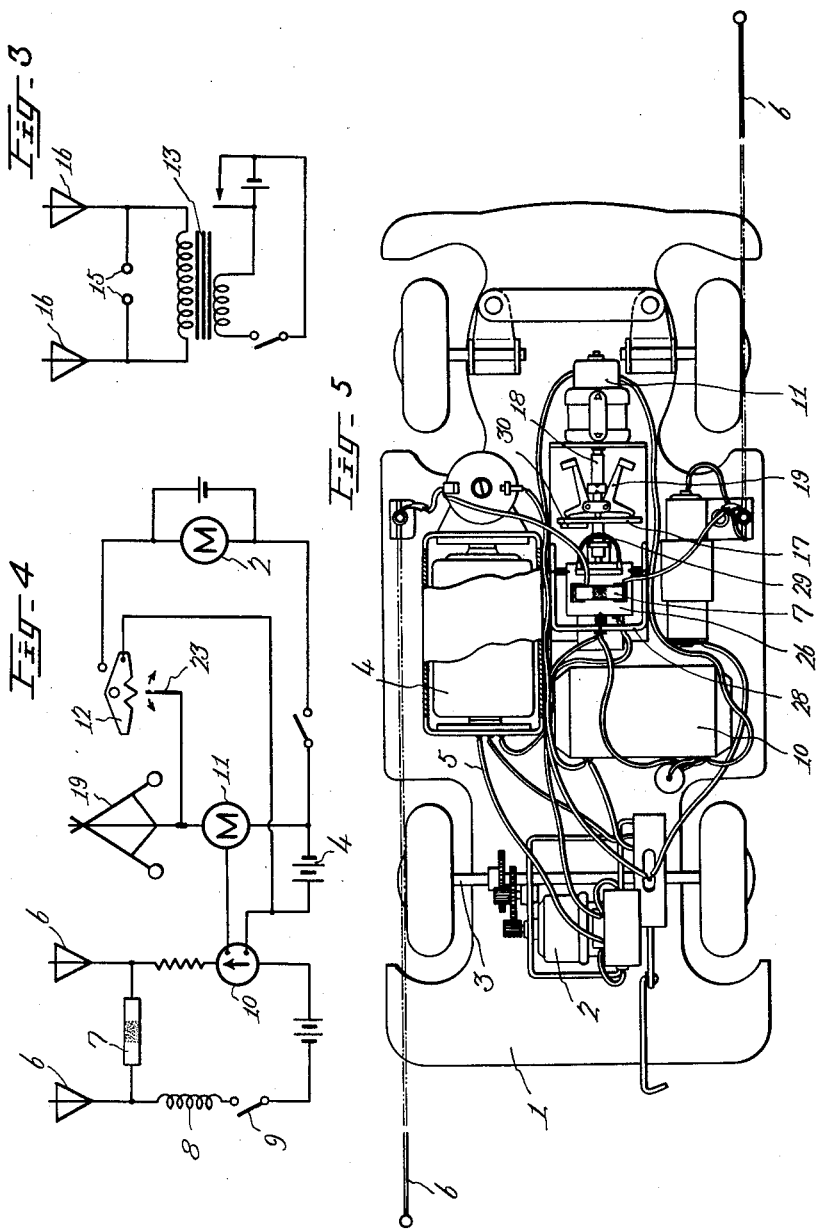
Inventor
Haruhiro Saito
By Michael S. Striker
agt

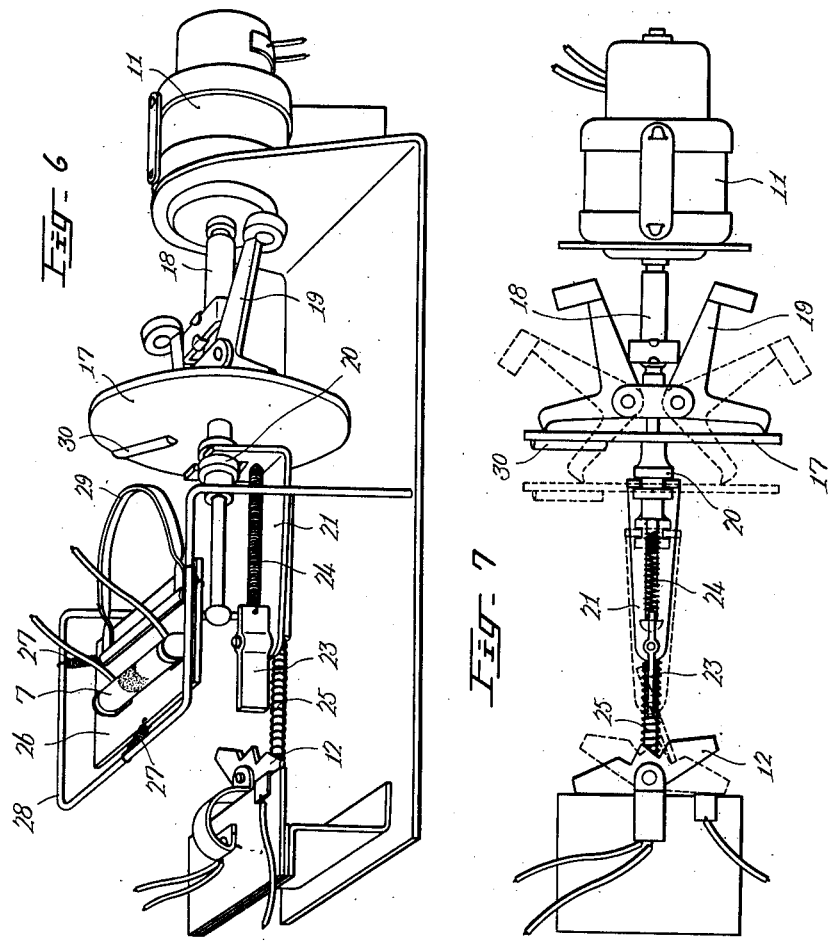

United States Patent Office 3,029,371
Patented Apr. 10, 1962

3,029,371
RADIO CONTROL APPARATUS FOR ELECTRIC RUNNING TOYS
Haruhiro Saito, No. 2, 3-chome Asakusa Kuramae, Daito-ku, Tokyo, Japan
Filed June 9, 1955, Ser. No. 514,190
9 Claims. (Cl. 318—16)

This invention relates to a radio control apparatus for electric running toys. According to this invention, there is provided on a chassis, together with an electric motor for driving an axle and its power source, a switch on the circuit connecting both. The actuating device for the switch is made relative to a driving unit which strikes a coherer provided as a detector of an electric wave receiver. And when the antenna on top of the chassis receives the electric wave beamed by an electric wave transmitter, the switch of the electric motor circuit is simultaneously closed by action of the coherer and relay, starting the electric motor. The instant this switch actuates, the driving unit actuates, striking the coherer and opening the radio circuit. Next, when an electric wave beamed by the transmitter is again received, the coherer and relay operate to open the power transmission circuit that has been closed by the previous action and stop the motor. At the instant this switch actuates, the driving unit, in the same manner as before, strikes the coherer and opens the radio circuit again to await the next reception.

In the drawings wherein an embodiment of this invention is shown, FIG. 1 is a perspective view of a toy equipped with an electric wave receiver, FIG. 2 is likewise a perspective view of an electric wave transmitter, FIG. 3 is a wiring diagram of the electric wave transmitter and FIG. 4 a wiring diagram of the electric wave receiver, FIG. 5 is a plan view showing the inside by removing the base plate of the toy in FIG. 1, FIG. 6 is a fractional perspective view showing the driving unit of a coherer, and FIG. 7 is a plan view showing the driving unit and a switch operating device connected therewith, on the circuit connecting the electric motor for driving the axle and its power source.

Referring to the drawings, 1 is a chassis, 2 an electric motor for driving the axle 3, 4 a battery provided as source of electricity, 5 a circuit connecting said battery and the electric motor 2, 6 a receiving antenna, 7 a coherer, 8 a high frequency coil, 9 a wireless power switch, 10 a meter type relay, 11 an electric motor for actuating the driving unit, 12 a power transmission circuit switch of the electric motor 2, 13 an induction coil of an electric wave transmitter 14, 15 a discharge electrode, 16 an antenna, 17 a slidable revolving disc secured on a shaft 18 of the electric moor 11 and a governor type actuator 19 at the back thereof mounted on the shaft is made to come in contact with same, 20 is a hub of the revolving disc to which is loosely secured the back end of a supporting arm 21 and to the front end of said supporting arm is pivotally secured an actuating member 23 which operates the switch 12 and which is supported at all times in the direction of the axis line by means of a tension spring 24, 25 is a compression spring which pushes the revolving disc 17 against the governor type actuator, 26 a supporting plate of the coherer which is hung to a supporting frame 28 by means of springs 27, and an arcuated ring 29 attached at its front end is made to come in contact with an engaging protrusion 30 mounted on the frontal surface of the revolving disc 17.

Now, in the operation of this apparatus, an electric wave is beamed by the transmitter. When this electric wave is received by the antenna 6 on top of the chassis equipped with a receiver, the internal resistance of the coherer 7 drops. This makes the meter type relay 10 operate, and the circuit of the motor 11 closes and starts the said motor. Then, as the governor type actuator 19 on the shaft 18 opens by centrifugal force and slides the revolving disc 17 towards the left on the said shaft 18 as shown in FIG. 7, the actuating member 23 operates the switch 12 and closes the circuit of the motor 2. Consequently, the electric motor 2 starts, driving the axle 3 and making the chassis run. At this time the engaging protrusion 30 arranged on the frontal surface of the revolving disc 17 strikes the arcuated ring 29, and as this vibrates the supporting plate 26 of the coherer 7, the array of metal dust of the coherer is broken up and the radio circuit is opened. This stops the electric motor 11 from running. In this manner, when the chassis is scampering about and an electric wave is beamed again from the transmitter, the electric motor 11 by the same action as before starts and the actuating member 23 opens the switch 12, stopping the electric motor 2 from running and respectively the speeding chassis. In this case, too, the coherer, simultaneously upon reception, closes the radio circuit but as the supporting plate gets struck and vibrates, the radio circuit opens immediately, the electric motor stops, and it is ready for the next reception.

As described above, according to the present invention, it is possible to make a running chassis to scamper about or make it stop when it is running by means of beaming electric wave with a transmitter. It can be controlled by the transmitter at a distance considerably far away. This apparatus, as described, does not use any vacuum tube but a coherer, thereby making it strikingly simplified, and consequently it is easy to make and its cost is cheap. It gives no trouble even if it receives some impact, since no vacuum tubes are used, and furthermore, it is easy to operate. Therefore, as a radio control apparatus for toys this is indeed an effective and suitable invention.

What I claim is:

1. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a control motor mounted on said base member and adapted to move said switching means between circuit-closing and circuit-opening positions upon energization of said control motor, said control motor being connected in circuit with said energizing means for energizing the same; second switching means connected in circuit between said control motor and said energizing means and movable between circuit-closing position wherein said control motor is energized and circuit-opening position wherein said control motor is deenergized; and control means for moving said second switching means into circuit-closing position upon receiving a transmitted electrical impulse and for moving said second switching means into circuit-opening position after said first-mentioned switching means has been moved by said energized control motor.

2. A movable apparatus adapted to be remotely controlled by transmitted electrical impulses comprising, in combination, a movable base member; a first motor mounted on said base member and adapted to move said movable base member upon energization thereof; energizing means mounted on said base member and connected in circuit with said first motor for energizing the same; first switching means mounted on said base member and connected in circuit between said energizing means and said first motor, said first switching means being movable between circuit-closing position wherein said first motor is energized and circuit-opening position wherein said first motor is deenergized; rotatable means mounted on said base member and connected in circuit with said energizing means and adapted to be rotated upon energization by said energizing means, said rotatable means being associated with said first switching means for moving the same between its circuit-opening and circuit-closing positions upon rotation thereof; second switching means mounted on said base member and connected in circuit between said energizing means and said rotatable means, said second switching means being movable between a circuit-closing position wherein said rotatable means is rotated and a circuit-opening position wherein said rotatable means ceases rotation; and a receiving circuit mounted on said base member and associated with said second switching means, said receiving circuit being adapted to receive said transmitted electrical impulses and to move said second switching means between its circuit-opening and circuit-closing positions in response to said received transmitted impulses whereby when said second switching means is in its circuit-closing position, said rotatable means is rotated to move said first switching means between its circuit-opening and circuit-closing positions.

3. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; and control means mounted on said base member and responsive to said transmitted electrical impulses for moving said switching means between its circuit-closing and circuit-opening positions in accordance with the transmitted electrical impulses received at said control means, said control means including a receiving antenna adapted to receive said transmitted electrical impulses, a receiving circuit responsive to each of said received electrical impulses and for providing an output voltage, actuating means connected between said receiving circuit and said switching means for moving said switching means in response to said output voltage, and time limiting means for limiting the time of operation of said receiving circuit until said actuating means has moved said switching means between its respective circuit-opening and circuit-closing positions.

4. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a receiving circuit mounted on said base member and adapted to receive said transmitted impulses and provide an output voltage responsive thereto; actuating means connected to said receiving circuit and responsive to said output voltage for actuating said switching means to move the same between its circuit-opening and circuit-closing positions; and limiting means for rendering said receiving circuit ineffective after said actuating means has moved said switching means between its circuit-opening and circuit-closing positions.

5. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a receiving circuit mounted on said base member and adapted to receive said transmitted impulses and provide an output voltage responsive thereto, said receiving circuit including a coherer having an electrical resistance which is changed by said received electrical impulse to provide said output voltage; actuating means connected to said receiving circuit and responsive to said output voltage for actuating said switching means to move the same between its circuit-opening and circuit-closing positions; and limiting means for rendering said receiving circuit ineffective by increasing the electrical resistance of said coherer after said actuating means has moved said switching means between its circuit-opening and circuit-closing positions.

6. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a receiving circuit mounted on said base member and adapted to receive said transmitted impulses and provide an output voltage responsive thereto; a control motor connected to said receiving circuit and energized by said output voltage to cause rotation thereof; and actuating means connected to said motor to rotate with the same upon energization by said output voltage, said actuating means being slidable between a first position wherein it is out of engagement with said switching means and a second position where it engages said switching means and moves the same between its respective circuit-closing and circuit-opening positions, whereby when said receiving circuit receives a transmitted impulse, said output voltage is provided thereby for energizing and rotating said control motor and said actuating means to move said actuating means into engagement with said switching means to move the same between its respective circuit-opening and circuit-closing positions.

7. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a receiving circuit mounted on said base member and adapted to receive said transmitted impulses and provide an output voltage responsive thereto; a control motor connected to said receiving circuit and energized by said output voltage to cause rotation thereof; actuating means connected to said motor to rotate with the same upon energization by said output voltage, said actuating means being slidable between a first position wherein it is out of engagement with said switching means and a second position where it engages said switching means and moves the same between its respective circuit-closing and circuit-opening positions; and limiting means for rendering said receiving circuit ineffective after said actuating means has moved said switching means between its circuit-opening and circuit-closing positions, whereby when said receiving circuit receives a transmitted impulse, said output voltage is provided thereby for energizing and rotating said control motor and said actuating means to move said actuating means into engagement with said switching means to move the same between its respective circuit-opening and circuit-closing positions and said limiting means renders said receiving circuit ineffective after said engagement by said actuating means.

8. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; a receiving circuit mounted on said base member and adapted to receive said transmitted impulses and provide an output voltage responsive thereto; a coherer element connected in said receiving circuit and having an electrical resistance which is changed by said received electrical impulse to provide said output voltage; a control motor connected to said receiving circuit and energized by said output voltage to cause rotation thereof; actuating means connected to said motor to rotate with the same upon energization by said output voltage, said actuating means being slidable between a first position wherein it is out of engagement with said switching means and a second position where it engages said switching means and moves the same between its respective circuit-closing and circuit-opening positions; and limiting means for rendering said receiving circuit ineffective by increasing the electrical resistance of said coherer after said actuating means has moved said switching means between its circuit-opening and circuit-closing positions, whereby when said receiving circuit receives a transmitted impulse, said output voltage is provided thereby for energizing and rotating said control motor and said actuating means to move said actuating means into engagement with said switching means to move the same between its respective circuit-opening and circuit-closing positions.

9. A movable apparatus adapted to be remotely controlled by transmitted electrical impulses, comprising, in combination, a base member; moving means adapted to move said base member whenever said moving means is energized; energizing means connected in circuit with said moving means for energizing the same; switching means connected in circuit between said energizing means and said moving means, said switching means being movable between circuit-closing position wherein said moving means is energized and circuit-opening position wherein said moving means is deenergized; and centrifugally operated control means mounted on said base member and responsive to said transmitted electrical impulses for moving said switching means between its circuit-closing and circuit-opening positions in accordance with the transmitted electrical impulses received at said control means.

References Cited in the file of this patent

UNITED STATES PATENTS

| | | |
|---|---|---|
| 970,592 | Ybarrondo | Sept. 20, 1910 |
| 1,032,968 | Vanderburg | July 16, 1912 |
| 2,622,542 | Bonanno | Dec. 23, 1952 |
| 2,690,626 | Gay et al. | Oct. 5, 1954 |
| 2,742,735 | Sommerhoff | Apr. 24, 1956 |